(12) United States Patent
da Silva et al.

(10) Patent No.: US 9,811,520 B1
(45) Date of Patent: Nov. 7, 2017

(54) IDENTIFYING IT COMPONENTS BASED ON IDENTIFICATION MARKERS

(71) Applicant: EMC Corporation, Hopkinton, MA (US)

(72) Inventors: Thiago da Silva, Shrewsbury, MA (US); Bruce R. Rabe, Dedham, MA (US); Scott Joyce, Foxboro, MA (US); Peter Chen, Charlton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/720,493

(22) Filed: Dec. 19, 2012

(51) Int. Cl.
*G06F 17/30* (2006.01)

(52) U.S. Cl.
CPC ........ *G06F 17/30002* (2013.01); *G06F 17/30* (2013.01); *G06F 17/30286* (2013.01)

(58) Field of Classification Search
CPC ............... G06F 17/30; G06F 17/30286; G06F 17/30002
USPC ......................................................... 235/375
See application file for complete search history.

(56) References Cited

U.S. PATENT DOCUMENTS

| 8,171,142 | B2 | 5/2012 | Kolin et al. | |
|---|---|---|---|---|
| 2004/0195310 | A1* | 10/2004 | Silverbrook et al. | 235/375 |
| 2005/0035207 | A1* | 2/2005 | Philyaw et al. | 235/462.42 |
| 2011/0218730 | A1 | 9/2011 | Rider et al. | |
| 2011/0241833 | A1* | 10/2011 | Martin et al. | 340/10.1 |
| 2013/0026220 | A1* | 1/2013 | Whelihan | 235/375 |
| 2013/0031202 | A1* | 1/2013 | Mick et al. | 709/217 |
| 2013/0186956 | A1* | 7/2013 | Ashok et al. | 235/385 |

OTHER PUBLICATIONS

Deffeyes and Katz, "Augmented Reality in the data center," Academy TechNotes, 2010, (1 page), ATN vol. 1 No. 2, IBM Academy of Technology. 2010.
Deffeyes, "Mobile augmented reality in the data center," IBM J. Res & Dev., Sep./Oct. 2011, (5 pages), vol. 55 No. 5 Paper 5.
Kan and Teng, "A Framework for Multifunctional Augmented Reality Based on 2D Barcodes," SIGGRAPH 2010, (1 page). Jul. 25-29, 2010.

* cited by examiner

Primary Examiner — Toan Ly
(74) Attorney, Agent, or Firm — BainwoodHuang (57) ABSTRACT

Described are methods, systems, and apparatus, including computer program products for identifying IT components. An image of at least a portion of a first IT component and a second IT component is acquired by a mobile computing device. A first identification marker on the first IT component is located in the image. An identity of the first IT component based on the first identification marker is determined by the mobile computing device. A second identification marker on the second IT component is located in the image. An identity of the second IT component based on the second identification marker is located in the image by the mobile computing device. The image is displayed by the mobile computing device. Indicia of the identity of the first IT component and the second IT component is overlayed by the mobile computing device in the image.

20 Claims, 6 Drawing Sheets

IDENTIFYING IT COMPONENTS BASED ON IDENTIFICATION MARKERS

TECHNICAL FIELD

The present technology relates generally to IT component management and, more specifically, to identifying IT components.

BACKGROUND

In some implementations, a data center can provide computer processing and/or storage resources. A data center can support performing one or more prescribed processing tasks. In some common applications, for example, a data center can be used to implement any kind of network-accessible service (such as an Email service, search service, etc.). In some common applications, a data center can be used to implement storage, backup, and/or archival functionality.

A data center can include various physical resources to facilitate provision of, e.g., computer processing and/or storage. A data center can include IT components, such as racks, servers, data storage devices, networking equipment, and uninterruptible power supplies (UPSs). Data centers can include supporting resources, such as HVAC units, chillers, cooling equipment, generators, and battery backup systems. In some cases, the physical resources of a data center can be housed in an enclosure, such as a room or building. For a large-scale service, a data center can require a large number of physical resources occupying one or more buildings.

There have been recent developments in mobile computing devices such as laptops, smart phones, and tablets. In particular, mobile computing devices can provide a variety of functions such as a digital camera capable of functioning as an optical code scanner.

Optical code scanners can be used in applications that rely on optical codes, such as bar codes, Quick Response (QR) codes, or other matrix codes, to store information. Industries such as retail, airline, self service, automotive, parcel delivery, pharmaceutical and healthcare use optical codes to provide inventory control, customer identification, item tracking and many other functions. Optical code scanners scan or read an optical code that is typically attached to or printed on an object. A typical optical code is comprised of a number of bars or modules. Information is encoded in an optical code by the arrangement of bars or modules. When an optical code is placed within the field of view of a scanner, the scanner can read the bars or modules comprising the optical code and then use this data to decode the information encoded in the optical code. This operation is called decoding an optical code. The information produced by decoding an optical code can take the form of an alphanumeric string, numeric string, or binary string.

SUMMARY

As the number of the IT components in data centers increase, the management of the data centers becomes increasingly complex. Accordingly, there is a need to simplify the management of data centers. As described herein, mobile computing devices and optical codes can be used to identify IT components, thereby facilitating management.

In one aspect, there is a method executed on a mobile computing device for identifying a plurality of IT components. The method can include acquiring, by the mobile computing device, an image of at least a portion of a first IT component and at least a portion of a second IT component. The method can include locating in the image, by the mobile computing device, a first identification marker on the first IT component. The method can include determining, by the mobile computing device, an identity of the first IT component based on the first identification marker. The method can include locating in the image, by the mobile computing device, a second identification marker on the second IT component. The method can include determining, by the mobile computing device, an identity of the second IT component based on the second identification marker. The method can include displaying, by the mobile computing device, the image. The method can include overlaying, by the mobile computing device, indicia of the identity of the first IT component on the first IT component in the image. The method can include overlaying, by the mobile computing device, indicia of the identity of the second IT component on the second IT component in the image.

In some embodiments, the first identification marker can include ultraviolet (UV) ink, and acquiring, by the mobile computing device, the image of the at least a portion of the first IT component and the at least a portion of a second IT component can include illuminating the first IT component with UV light and collecting, by the mobile computing device, a portion of UV light reflected by the first IT component.

In some embodiments, determining, by the mobile computing device, the identity of the first IT component based on the first identification marker can include decoding, by the mobile computing device, the first identification marker and querying, by the mobile computing device, a database for the identity of the first IT component based on the decoded first identification marker.

In some embodiments, the first identification marker can be an encoding of the identity of the first IT component, and determining, by the mobile computing device, the identity of the first IT component based on the first identification marker includes decoding, by the mobile computing device, the first identification marker to obtain the identity of the first IT component.

In some embodiments, the method includes retrieving, by the mobile computing device, status information about the first IT component. In some embodiments, the method includes retrieving, by the mobile computing device, status information about the second IT component. In some embodiments, the method includes, overlaying on the first IT component in the image, by the mobile computing device, indicia of the status information about the first IT component. In some embodiments, the method includes overlaying on the second IT component in the image, by the mobile computing device, indicia of the status information about the second IT component.

In another aspect, there is a computer program product, tangibly embodied in a non-transitory computer readable storage medium, that can include instructions being operable to cause a mobile computing device to acquire an image of at least a portion of a first IT component and at least a portion of a second IT component. The computer program product can include instructions being operable to cause a mobile computing device to locate in the image a first identification marker on the first IT component. The computer program product can include instructions being operable to cause the mobile computing device to determine an identity of the first IT component based on the first identification marker. The computer program product can include instructions being operable to cause the mobile computing device to locate in the image a second identification marker on the second IT component. The computer program product can include instructions being operable to cause the mobile computing device to determine an identity of the second IT component based on the second identification marker. The computer program product can include instructions being operable to cause the mobile computing device to display the image. The computer program product can include instructions being operable to cause the mobile computing device to overlay indicia of the identity of the first IT component on the first IT component in the image. The computer program product can include instructions being operable to cause the mobile computing device to overlay indicia of the identity of the second IT component on the second IT component in the image.

In some embodiments, the first identification marker includes UV ink, and the instructions being operable to cause the mobile computing device to acquire the image of the at least a portion of the first IT component and the at least a portion of a second IT component include instructions being operable to cause the mobile computing device to illuminate the first IT component with UV light and collect a portion of UV light reflected by the first IT component.

In some embodiments, the instructions being operable to cause the mobile computing device to determine the identity of the first IT component based on the first identification marker include instructions being operable to cause the mobile computing device to decode the first identification marker and query a database for the identity of the first IT component based on the decoded first identification marker.

In some embodiments, the first identification marker can be an encoding of the identity of the first IT component, and wherein the instructions being operable to cause the mobile computing device to determine the identity of the first IT component based on the first identification marker include instructions being operable to cause the mobile computing device to decode the first identification marker to obtain the identity of the first IT component.

In some embodiments, the computer program product includes instructions being operable to cause the mobile computing device to retrieve status information about the first IT component. In some embodiments, the computer program product includes instructions being operable to cause the mobile computing device to retrieve status information about the second IT component. In some embodiments, the computer program product includes instructions being operable to cause the mobile computing device to overlay on the first IT component in the image indicia of the status information about the first IT component. In some embodiments, the computer program product includes instructions being operable to cause the mobile computing device to overlay on the second IT component in the image indicia of the status information about the second IT component.

In another aspect, there is a mobile computing device including a camera and a screen. In some embodiments, the mobile computing device can include a data center management module configured to acquire, from the camera, an image of at least a portion of a first IT component and at least a portion of a second IT component. In some embodiments, the mobile computing device can include a data center management module configured to locate in the image a first identification marker on the first IT component. In some embodiments, the mobile computing device can include a data center management module configured to determine an identity of the first IT component based on the first identification marker. In some embodiments, the mobile computing device can include a data center management module configured to locate in the image a second identification marker on the second IT component. In some embodiments, the mobile computing device can include a data center management module configured to determine an identity of the second IT component based on the second identification marker. In some embodiments, the mobile computing device can include a data center management module configured to display the image on the screen. In some embodiments, the mobile computing device can include a data center management module configured to overlay indicia of the identity of the first IT component on the first IT component in the image on the screen. In some embodiments, the mobile computing device can include a data center management module configured to overlay indicia of the identity of the second IT component on the second IT component in the image on the screen.

In some embodiments, the data center management module is configured to determine the identity of the first IT component based on the first identification marker by decoding the first identification marker and query a database for the identity of the first IT component based on the decoded first identification marker.

In some embodiments, the first identification marker is an encoding of the identity of the first IT component, and the data center management module is configured to determine the identity of the first IT component based on the first identification marker by decoding the first identification marker to obtain the identity of the first IT component.

In some embodiments, the data center management module is configured to retrieve status information about the first IT component. In some embodiments, the data center management module is configured to retrieve status information about the second IT component. In some embodiments, the data center management module is configured to overlay on the first IT component in the image indicia of the status information about the first IT component. In some embodiments, the data center management module is configured to overlay on the second IT component in the image indicia of the status information about the second IT component.

In some embodiments, the first identification marker and the second identification marker are QR codes. In some embodiments, the first IT component comprises a case with the first identification marker printed on a face of the case. In some embodiments, the first IT component is disposed adjacently to the second IT component, forming a row.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the technology, as well as the technology itself, will be more fully understood from the following description of various embodiments, when read together with the accompanying drawings, in which.

DETAILED DESCRIPTION

Described herein is technology for managing IT components in a data center. The technology can be used to identify IT components, using mobile computing devices and identification markers, such as optical codes. The technology can involve a mobile computing device reading multiple identification markers on IT components to identify the IT components. In some embodiments, optical codes are applied to the face of IT components, where the optical codes cover substantially all of the IT components' faces. Beneficially, by covering substantially all of the IT components' faces, the optical codes can be read from a greater distance. A mobile computing device can then be used to capture a digital image of one or more of the IT components' faces, and the optical codes applied thereto. The mobile computing device can decode the optical codes in the digital image to identify each of the IT components in the digital image.

The technology can facilitate identifying IT components. For example, the techniques can be used to identify IT components for service. In an exemplary service workflow, a service person can use the technology to locate a particular IT component for service. The service person can use the technology to identify multiple IT components (e.g., servers in a row of servers) at the same time to determine if any of the IT components is the particular IT component requiring service. As another example, the service person can identify multiple IT components to collect information about the data center (e.g., which servers are in a particular row). Beneficially, the technology can identify multiple IT components, thereby avoiding the need to identify each IT component individually (e.g., scan each identification marker individually).

The identity of an IT component can be any numeric or alpha-numeric string that identifies the IT component. For example, the identity of an IT component can be the IT component's serial number, IP address, or system name. The identity of an IT component can include model, manufacturer, or other specification data.

Figure 1A:
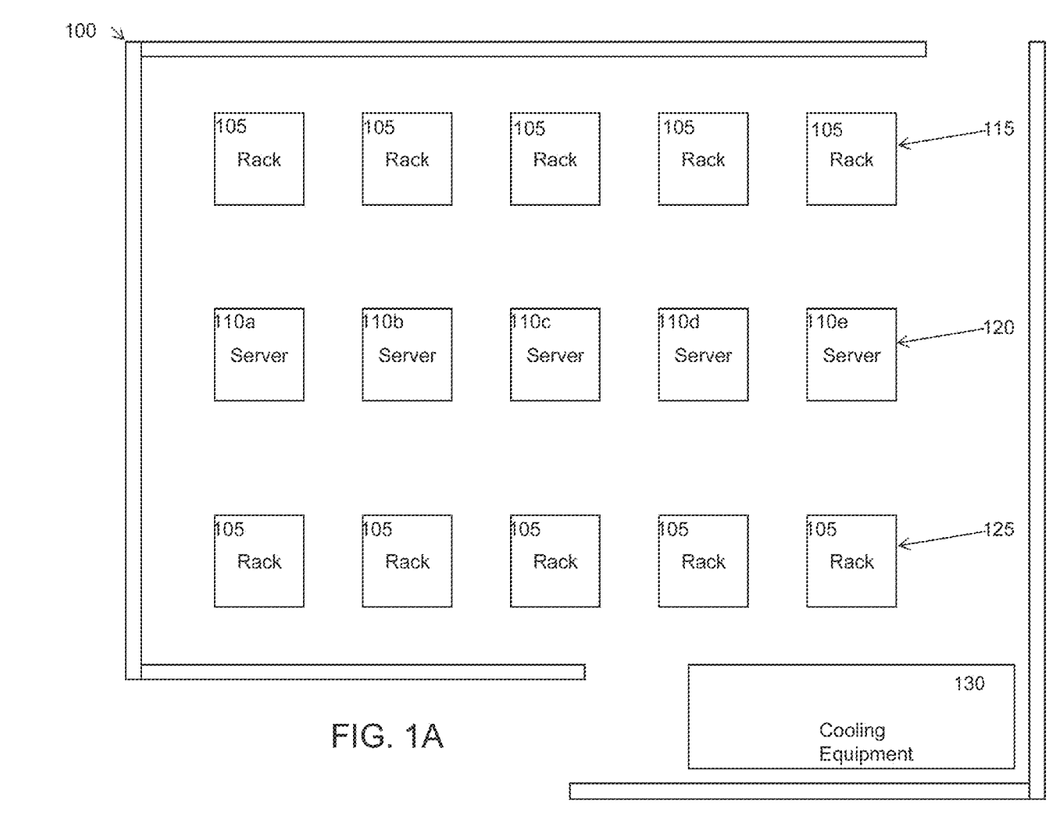
FIG. 1A depicts an exemplary data center.

FIG. 1A depicts exemplary data center 100. Data center 100 includes various IT components, such as racks 105 and servers 110a-110e (generally servers 110). As illustrated, multiple racks 105 are positioned in row 115, multiple servers 110 are positioned in row 120, and multiple racks 105 are positioned in row 125. Additionally, data center 100 contains cooling equipment 130. Racks 105 can house other IT components, such as servers, data storage devices, networking equipment, and UPSs. Servers 110 can be any kind of computing device.

As described in greater detail below, the technology can facilitate identifying IT components in a data center, such as data center 100. For example, the techniques can be used to identify the servers 110 in row 120. The technology can be used to identify the racks 105 in row 115. The techniques can be used to identify the IT components (e.g., servers) in rack 105.

Figure 1B:
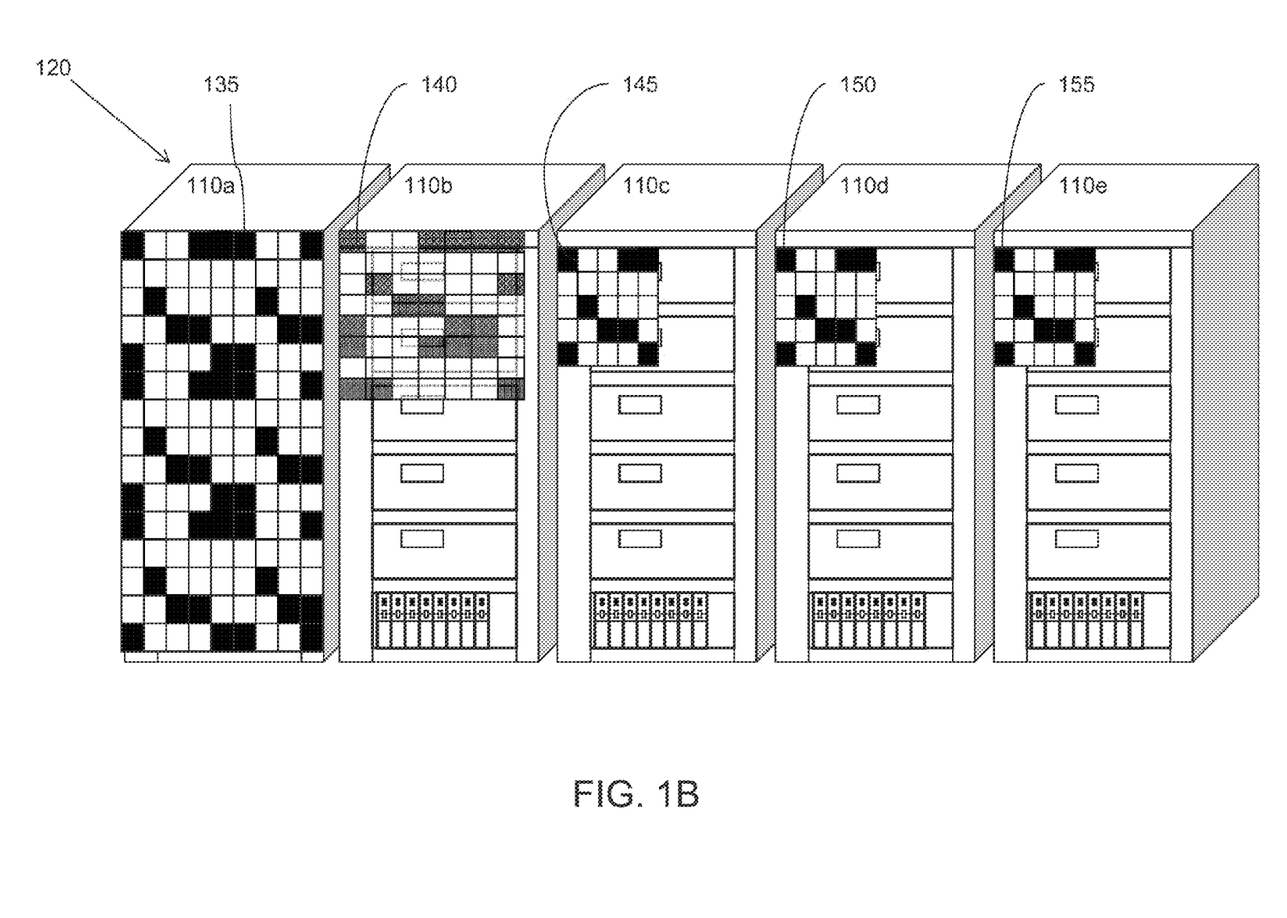
FIG. 1B depicts a row of servers in a data center.

FIG. 1B depicts row 120 of servers 110a-110e in data center 100. As illustrated in FIG. 1B, servers 110 include identification markers. Identification marker 135 covers substantially all of the face of server 110a. Identification marker 140 covers substantially all of the width of the face of server 110b. Identification markers 145, 150, and 155 cover portions of the faces of servers 110c, 110d, and 110e, respectively.

In some embodiments, identification markers can be applied directly to IT components. For example, identification marker 135 can be applied to the face of server 110a during the manufacturing process. In some embodiments, identification marker 135 can comprise ink, paint or powder coat applied to the face of server 110a. In some embodiments, identification markers can be printed on paper or a label and affixed to the face of an IT component. IT components can be in a rack or cabinet. In some embodiments, an identification marker can be placed on a face of the rack or cabinet.

In some embodiments, identification markers can be printed in inks responsive to particular light or radiation. For example, identification markers can be printed in ultraviolet (UV) ink that becomes visible when illuminated with UV light. Beneficially, identification markers printed in UV ink can be substantially invisible when illuminated with non-UV light, thereby exposing other aspects of the face of the IT component (e.g., manufacturer branding, labels, displays, status lights, etc.).

In some embodiments, identification markers can be partially transparent. In the illustrated embodiment, for example, identification marker 140 is shown as partially transparent. Beneficially, partially transparent identification markers can partially expose other aspects of the face of the IT component (e.g., manufacturer branding, labels, displays, status lights, etc.).

Identification markers 135, 140, 145, 150, and 155 are merely exemplary. In some embodiments, identification markers can be QR codes. In some embodiments, identification markers can include any kind of optical code, such as Codabar, Code 11, EAN-13, EAN-8, MSI, Plessey, PostNet, UPC-A, UPC-E, LOGMARS, PDF417, DataMatrix, or Maxicode optical codes.

In the illustrated embodiments, identification markers 135, 140, 145, 150, and 155 can be of a size to permit scanning identification markers 135, 140, 145, 150, and 155 from, for example, 3 or more feet away. For example, identification marker can have a height of 8-12 inches or more.

Identification markers can represent data. In some QR codes, the arrangement of black modules and white modules can represent an alphanumeric string. In some embodiments, an identification marker can represent information about the IT component to which it is attached. In some embodiments, an identification marker can represent an IT component's serial number or other number assigned by its manufacturer. In some embodiments, an identification marker can represent an IT component identifier assigned by the system owner. In some embodiments, an identification marker can represent additional information about an IT component, such as IT components it contains, its IP address, etc.

Figure 2A:
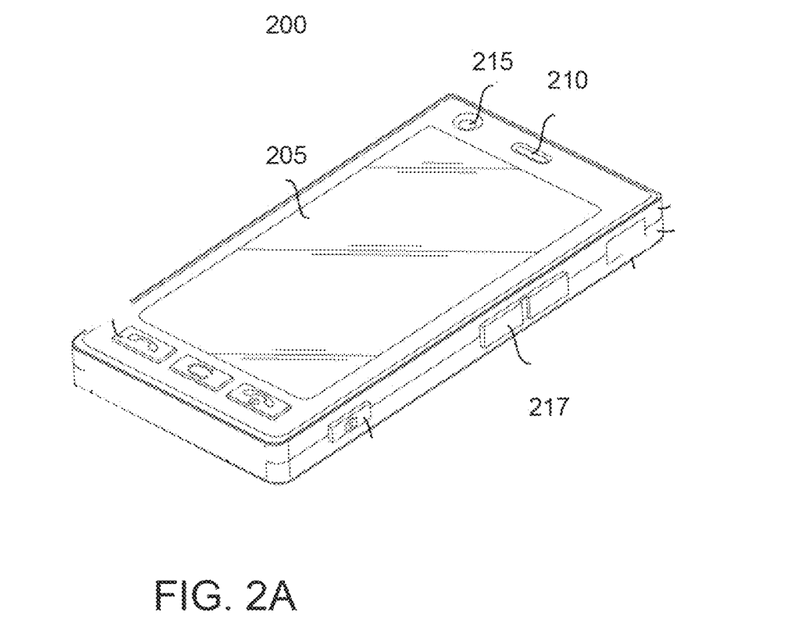
FIG. 2A depicts a front view of a mobile computing device.

FIG. 2A depicts a front view of a mobile computing device 200. As shown in FIG. 2A, mobile computing device 200 can have a bar-type body. In some embodiments, a mobile computing device can be a smartphone, cellular phone, tablet computer, laptop computer, or other computing device that can be brought into a data center. Mobile computing device 200 can include display 205, audio output unit 210, camera 215, and user input unit 217.

Figure 2B:
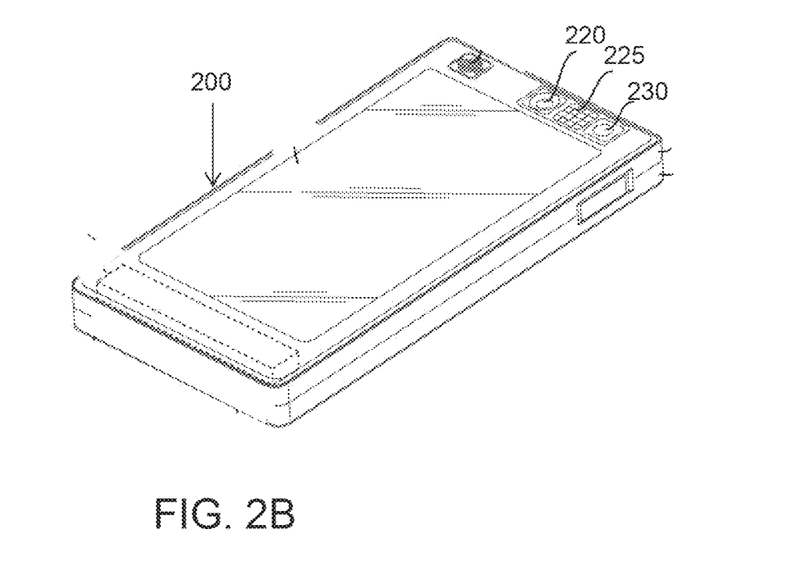
FIG. 2B depicts a back view of a mobile computing device.

FIG. 2B depicts a back view of mobile computing device 200. As shown in FIG. 2B, mobile computing device 200 can include camera 220. Camera 220 can have a photographing direction that is substantially opposite to a photographing direction of camera 215 and can have pixels differing from pixels of the camera 215.

Mobile computing device 200 can include flash 225 adjacent to the camera 220. Flash 225 can emit light toward a subject in case of photographing the subject using camera 220. In some embodiments, flash 225 can emit visible light. In some embodiments, flash 225 can emit UV light, IR light, or other portions of the spectrum. In some embodiments, camera 220 can capture visible light, UV light, and/or IR light.

Mobile computing device 200 can include antenna 230 for communication.

Figure 2C:
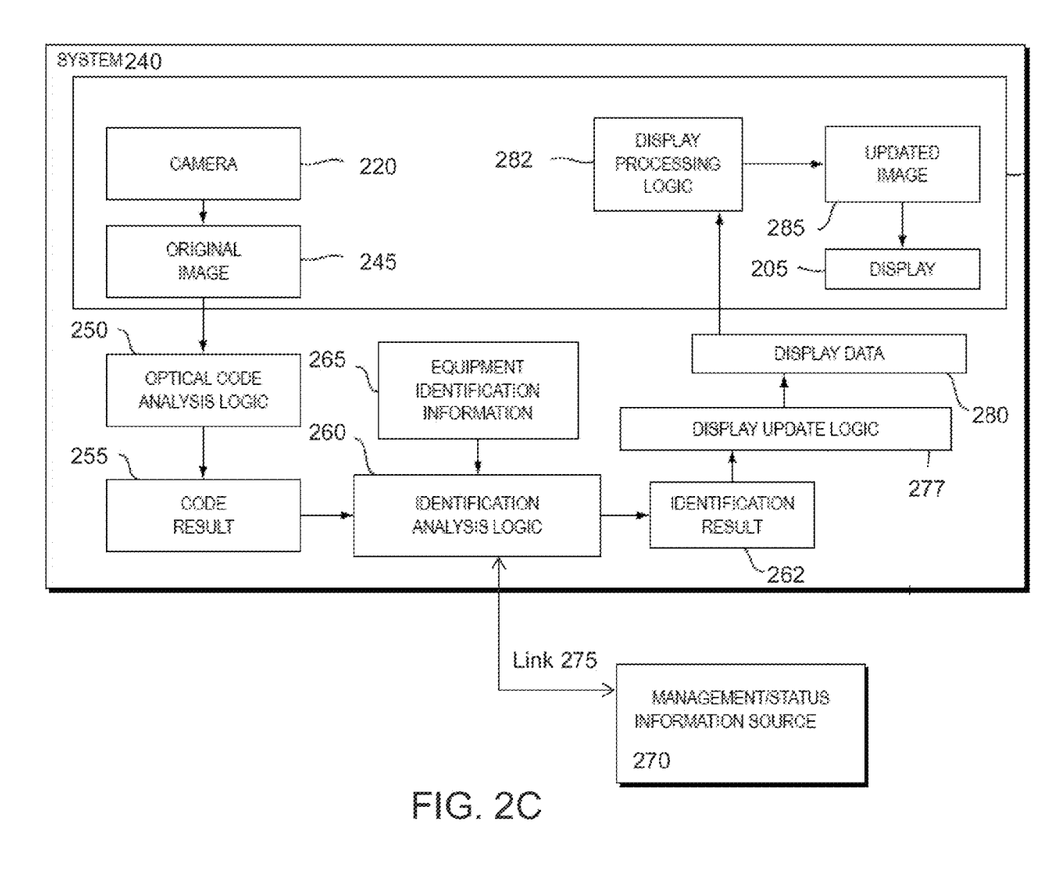
FIG. 2C depicts a block diagram of an optical code processing system.

FIG. 2C depicts a block diagram of an optical code processing system 240. Mobile computing device 200 can include optical code processing system 240 as a part of a data management module. Camera 220 can produce original image 245. Optical code analysis logic 250 can include logic that can be used to interpret one or more optical codes in original image 245, to produce code result 255. In some embodiments, code result 255 can include the decoded value or values for each optical code within original image 245 and the location of each optical code within original image 245.

Identification analysis logic 260 can, for example, determine an identification result 262 (e.g., the identity of an IT component) based on code result 255. In some embodiments, for example, code result 255 can be the decoded value of an optical code. Identification analysis logic 260 can, based on the decoded value of the optical code, request IT component identity from equipment identification information 265 and/or management/status information source 270. For example, if code result 255 includes a serial number of an IT component and equipment identification information 265 includes a database mapping serial numbers of IT components to IT component identities (e.g., IP address, system name, model, manufacturer, and/or other specification data), identification analysis logic 260 can retrieve IT component identities from equipment identification information 265. In the illustrated embodiment, equipment identification information 265 can be stored on mobile computing device 200. As another example, if code result 255 includes a serial number of an IT component and management/status information source 270 includes a database mapping serial numbers of IT components to IT component identities, identification analysis logic 260 can retrieve IT component identities from management/status information source 270. In some embodiments, IT component status information can be retrieved from management/status information source 270. In the illustrated embodiment, management/status information source 270 can be a separate computing device from mobile computing device 200 (e.g., a server). Mobile computing device 200 can communicate with management/status information source 270 via link 275 (e.g., via a WIFI connection over antenna 230).

Based on identification result 262, display update logic 277 can produce display data 280. Display processing logic 282 can use display data 280 to produce updated image 285. Updated image 285 can be displayed on display 205. In some embodiments, updated image 285 can be original image 245 with indicia of the identities of IT components overlayed over the IT components within original image 245.

In some embodiments, all or a portion of optical code processing system 240 can be included in mobile computing device 200. In some embodiments, one or more aspects of optical code processing system 240 can be located in a computing device separate from mobile computing device 200, such as a server.

Link 275 can enable communications between identification analysis logic 275 and external sources, such as management/status information source 270. Link 275 can be one or more TCP/IP lines, which may use a known protocol such as NFS, HTTP, and Windows Networking. Link 275 can be a WIFI or WAN or other wireless connection, or a dedicated physical connection such as a USB or serial connection.

Management/status information source 270 can be, can include, or can be included in a management system for IT components. Management/status information source 270 can support one or more interfaces such as an application programming interface (API), command line interface (CLI), graphical user interface (GUI), or web services.

Identification analysis logic 260 can obtain management and/or status information about IT components from Management/status information source 270. For example, Identification analysis logic 260 can obtain status information (e.g., utilization, runtime, etc.) about IT components from Management/status information source 270.

Figure 3:
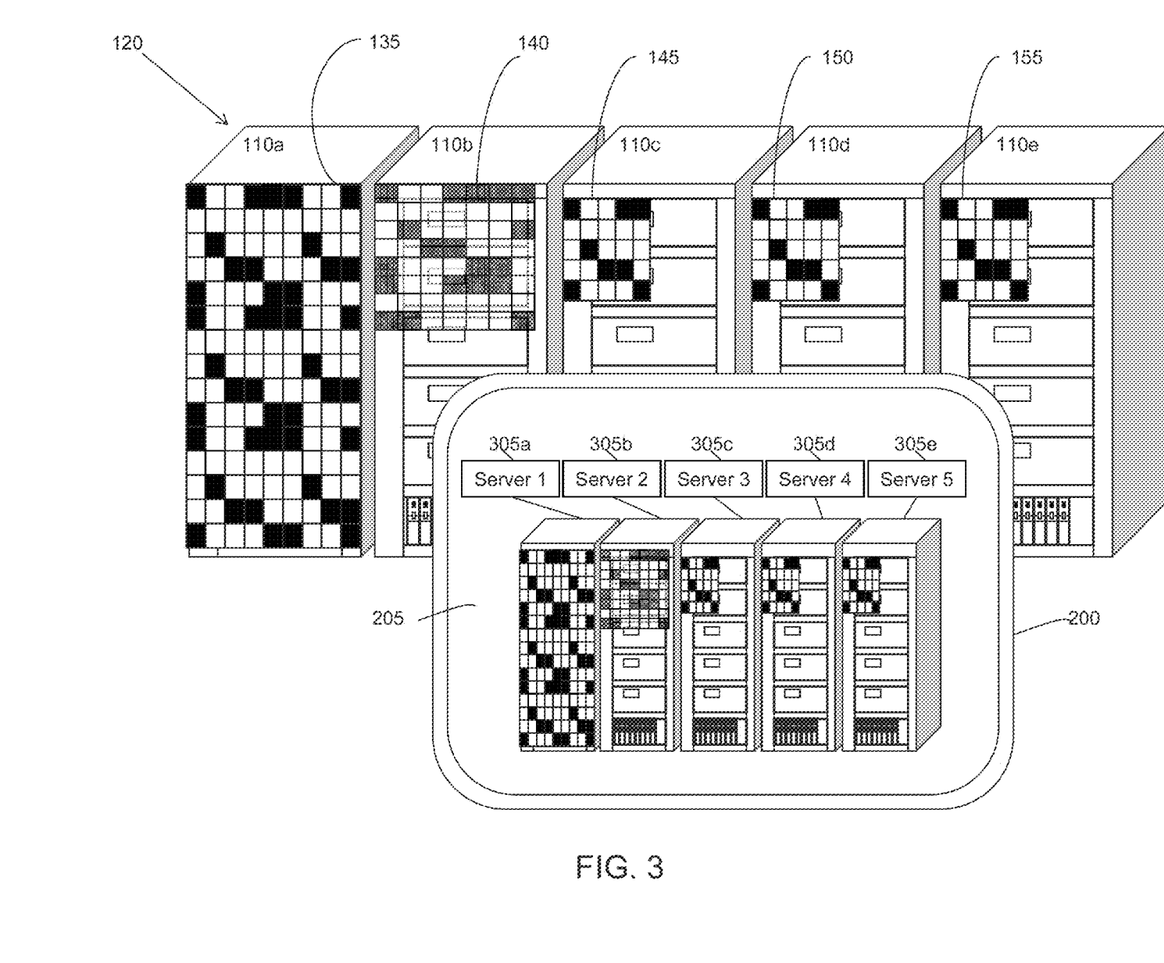
FIG. 3 illustrates a mobile computing device identifying IT components.
Figure 4:
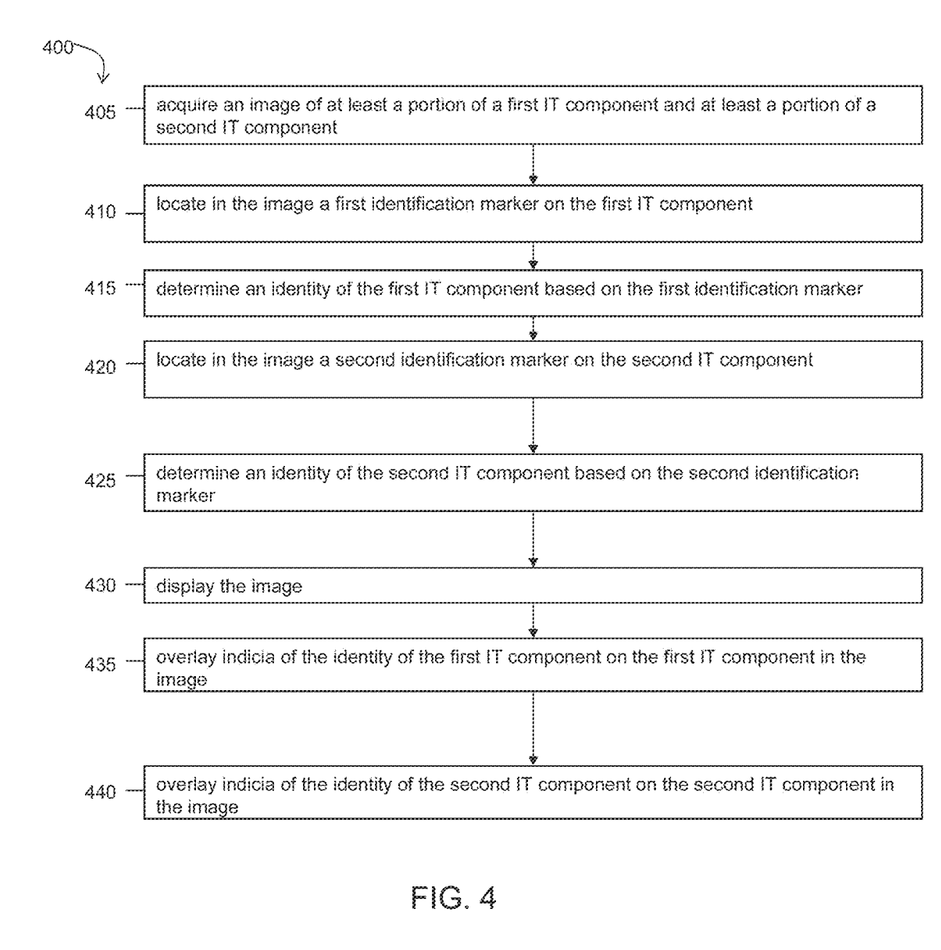
FIG. 4 depicts a flow chart for a method of identifying IT components.

Mobile computing device 200 can be used to identify IT components in a data center (e.g., data center 100). FIG. 3 illustrates mobile computing device 200 identifying servers 110*a*, 110*b*, 110*c*, 110*d*, and 110*e*. Servers 110*a*, 110*b*, 110*c*, 110*d*, and 110*e* are located in row 120 of data center 100, as previously described. FIG. 4 depicts flow chart 400 for a method for identifying IT components.

In some embodiments, mobile computing device 200 can acquire an image of at least a portion of a first IT component and at least a portion of a second IT component (step 405). For example, mobile computing device 200 can use camera 220 to acquire an image (e.g., original image 245) of servers 110*a*, 110*b*, 110*c*, 110*d*, and 110*e*. In some embodiments, mobile computing device 200 can use camera 220 to acquire an image in response to receiving a signal from user input unit 217.

Mobile computing device 200 can locate in the image a first identification marker on the first IT component (step 410). For example, mobile computing device 200 can use optical code analysis logic 250 of optical code processing system 240 to locate in original image 245 identification marker 135 on server 110*a*.

Mobile computing device 200 can determine an identity of the first IT component based on the first identification marker (step 415). For example, mobile computing device 200 can use optical code analysis logic 250 of optical code processing system 240 to generate code result 255 by processing the image of identification marker 135 on server 110*a*. In some embodiments, code result 255 can be an identity of server 110*a* (e.g., the serial number of server 110*a*). In some embodiments, code result 255 can used to determine the identity of server 110*a*. For example identification analysis logic 260 can use code result 255 to query identification information 265 or management/status information source 270 for the identity of server 110*a*.

Mobile computing device 200 can locate in the image a second identification marker on the second IT component (step 420). For example, mobile computing device 200 can use optical code analysis logic 250 of optical code processing system 240 to locate in original image 245 identification marker 140 on server 110*b*.

Mobile computing device 200 can determine an identity of the second IT component based on the second identification marker (step 425). For example, mobile computing device 200 can use optical code analysis logic 250 of optical code processing system 240 to generate code result 255 by processing the image of identification marker 140 on server 110b. In some embodiments, code result 255 can be an identity of server 110b (e.g., the serial number of server 110b). In some embodiments, code result 255 can be used to determine the identity of server 110b. For example identification analysis logic 260 can use code result 255 to query identification information 265 or management/status information source 270 for the identity of server 110b.

In some embodiments, mobile computing device 200 can use optical code analysis logic 250 of optical code processing system 240 to locate in original image 245 all instances of identification markers. For example, if original image 240 is an image of servers 110a, 110b, 110c, 110d, and 110e, including identification markers 135, 140, 154, 150, and 155, mobile computing device 200 can use optical code analysis logic 250 of optical code processing system 240 to locate in original image 245 and process each of identification markers 135, 140, 154, 150, and 155. In some embodiments, code result 255 can include the code result that results from processing each of identification markers 135, 140, 154, 150, and 155.

Mobile computing device 200 can display the image acquired (step 430). For example, mobile computing device 200 can display on screen 205 the image acquired. Display data 280 can include some or all of original image 245. Display processing logic 282 can use display data 280 to produce updated image 285, which includes some or all of original image 245. With reference to FIG. 3, screen 205 of mobile computing device 200 is illustrated showing updated image 285, which includes some or all of original image 245.

Mobile computing device 200 can overlay indicia of the identity of the first IT component on the first IT component in the image and indicia of the identity of the second IT component on the second IT component in the image (steps 435 and 440). For example, based on identification result 262, display update logic 277 can produce display data 280 that can include indicia of the identities of IT components. Display processing logic 282 can use display data 280 to produce updated image 285. Updated image 285 can be displayed on display 205. With reference to FIG. 3, screen 205 of mobile computing device 200 is illustrated showing updated image 285 that includes indicia 305a-305e, which are indicia of the identity of servers 110a, 110b, 110c, 110d, and 110e, respectively.

The above-described techniques can be implemented in digital electronic circuitry, or in computer hardware, firmware, software, or in combinations of them. The implementation can be as a computer program product, i.e., a computer program tangibly embodied in a non-transitory information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method executed on a mobile computing device for identifying a plurality of IT components, comprising:
   acquiring, by the mobile computing device, an image containing at least a portion of a first IT component and at least a portion of a second IT component, the first IT component containing a first one or more IT components, and the second IT component containing a second one or more IT components;
   locating in the image, by the mobile computing device, a first identification marker on the first IT component, the first identification marker representing first information about the first IT component and first additional information about the first one or more IT components contained in the first IT component;
   determining, by the mobile computing device, an identity of the first IT component based on the first information represented by the first identification marker;
   determining, by the mobile computing device, one or more identities of the first one or more IT components contained in the first IT component based on the first additional information represented by the first identification marker;
   locating in the image, by the mobile computing device, a second identification marker on the second IT component, the second identification marker representing second information about the second IT component and second additional information about the second one or more IT components contained in the second IT component;
   determining, by the mobile computing device, an identity of the second IT component based on the second information represented by the second identification marker;
   determining, by the mobile computing device, one or more identities of the second one or more IT components contained in the second IT component based on the second additional information represented by the second identification marker;
   displaying, by the mobile computing device, the image;
   overlaying, by the mobile computing device, indicia of at least the identity of the first IT component on the first IT component in the image; and
   overlaying, by the mobile computing device, indicia of at least the identity of the second IT component on the second IT component in the image.

2. The method of claim 1, wherein the first identification marker and the second identification marker are QR codes.

3. The method of claim 1, wherein the first IT component comprises a case with the first identification marker printed on a face of the case and the first identification marker covers substantially all of a face of the first component.

4. The method of claim 1, wherein the first identification marker comprises ultraviolet (UV) ink, and wherein acquiring, by the mobile computing device, the image of the at least a portion of the first IT component and the at least a portion of a second IT component comprises:
   illuminating the first IT component with UV light; and
   collecting, by the mobile computing device, a portion of UV light reflected by the first IT component.

5. The method of claim 1, wherein determining, by the mobile computing device, the identity of the first IT component based on the first identification marker comprises:
   decoding, by the mobile computing device, the first identification marker; and
   querying, by the mobile computing device, a database for the identity of the first IT component based on the decoded first identification marker.

6. The method of claim 1, wherein the first identification marker is encoding of the identity of the first component, and wherein determining, by the mobile computing device, the identity of the first IT component based on the first identification marker comprises decoding, by the mobile computing device, the first identification marker to obtain the identity of the first IT component.

7. The method of claim of claim 1, further comprising:
   retrieving, by the mobile computing device, status information about the first IT component;
   retrieving, by the mobile computing device, status information about the second IT component;
   overlaying on the first IT component in the image, by the mobile computing device, indicia of the status information about the first IT component; and
   overlaying on the second IT component in the image, by the mobile computing device, indicia of the status information about the second IT component.

8. The method of claim 1, wherein the first IT component is disposed adjacently to the second IT component, forming a row.

9. A computer program product; tangibly embodied in a non-transitory computer readable storage medium, comprising instructions being operable to cause a mobile computer device to:
   acquire an image containing at least a portion of a first IT component and at least a portion of a second IT component, the first IT component containing a first one or more IT components, and the second IT component containing a second one or more IT components;
   locate in the image a first identification maker on the first IT component, the first identification marker representing first information about the first IT component and first additional information about the first one or more IT components contained in the first IT component;
   determine an identify of the first IT component based on the first information represented by the first identification marker;
   determine one or more identities of the first one or more IT components contained in the first IT component based on the first additional information represented by the first identification marker;
   locate in the image a second identification maker on the second IT component, the second identification marker representing second information about the second IT component and second additional information about the second one or more IT components contained in the second IT component;
   determine an identify of the second IT component based on the second information represented by the second identification;
   determine one or more identities of the second one or more IT components contained in the second IT component based on the second additional information represented by the second identification marker;
   display the image;
   overlay indicia of at least the identity of the first IT component on the first IT component in the image; and
   overlay indicia of at least the identity of the second IT component on the second IT component in the image.

10. The computer program product of claim 9, wherein the first identification marker and the second identification marker are QR codes.

11. The computer program product of claim 9, where in the first component comprises a case with the first identification marker printed on a face of the case and the first identification marker covers substantially all of a face of the first IT component.

12. The computer product of claim 9, wherein the first identification marker comprises ultraviolet (UV) ink, and wherein the instructions being operable to cause the mobile computing device to acquire the image of the at least a portion of the first IT component and the at least a portion of a second IT component comprise instructions being operable to cause the mobile computing device to:
Illuminate the first IT component with UV light; and
collect a portion of UV light reflected by the first IT component.

13. The computer program product of claim 9, wherein the instructions being operable to cause the mobile computing device to determine the identity of the first IT component based on the first identification marker comprises instructions being operable to cause the mobile computing device to:
decode that first identification marker; and
query a database for the identity of the first IT component based on the decoded first identification marker.

14. The computer program product of claim 9, wherein the first identification marker is an encoding of the identity of the first IT component, and wherein the instructions being operable to cause the mobile computing device to determine the identity of the first IT component based on the first identification marker comprise instructions being operable to cause the mobile computing device to decode the first identification marker to obtain the identity of the first IT component.

15. The computer program product of claim 9, further comprising instructions being operable to cause a mobile computing device to:
retrieve status information about the first IT component;
retrieve status information about the second IT component;
overlay on the first IT component in the image indicia of the status information about the first IT component; and
overlay on the second IT component in the image indicia of the status information about the second IT component.

16. The computer program product of claim 9, wherein the first IT component is disposed adjacently to the second IT component forming a row.

17. A mobile computing device, comprising;
a camera;
a screen; and
a data center management module configured to:
acquire, from the camera, an image containing at least a portion of a first IT component and at least a portion of a second IT component, the first IT component containing a first one or more IT components, and the second IT component containing a second one or more IT components;
locate in the image a first identification marker on the first IT component, the first identification marker representing first information about the first IT component and first additional information about the first one or more IT components contained in the first IT component;
determine an identity of the first IT component based on the first information represented by the first identification marker;
determine one or more identities of the first one or more IT components contained in the first IT component based on the first additional information represented by the first identification marker;
locate in the image of a second identification marker on the second IT component, the second identification marker representing second information about the second IT component and second additional information about the second one or more IT components contained in the second IT component;
determine an identity of the second IT component based on the second information represented by the second identification marker;
determine one or more identities of the second one or more IT components contained in the second IT component based on the second additional information represented by the second identification marker;
overlay indicia of at least the identity of the first IT component on the first IT component in the image on the screen; and
overlay indicia of at least the identity of the second IT component on the second IT component in the image on the screen.

18. The mobile computing device of claim 17, wherein the data center management module is configured to determine the identity of the first IT component based on the first identification marker by decoding the first identification marker; and
query a database for the identity of the first IT component based on the decoded first identification marker.

19. The mobile computing device of claim 17, wherein the first identification marker is an encoding of the first system identity, and wherein the data center management module is configured to determine the identity of the first IT component based on the first identification marker to obtain the first system identity.

20. The mobile computing device of claim 17, wherein the data center management module is configured to:
retrieve status information about the first IT component;
retrieve status information about the second IT component;
overlay on the first IT component in the image indicia of the status information about the first IT component; and
overlay on the second IT component in the image indicia of the status information about the second IT component.

* * * * *